F. E. WHITE.
PIPE LINE FOR OIL STOVES AND OTHER PURPOSES.
APPLICATION FILED MAY 24, 1915.

1,157,484.

Patented Oct. 19, 1915.

Inventor:
Fred E. White.

UNITED STATES PATENT OFFICE.

FRED E. WHITE, OF GARDNER, MASSACHUSETTS, ASSIGNOR TO CENTRAL OIL AND GAS STOVE CO., OF GARDNER, MASSACHUSETTS, A CORPORATION OF MASSACHUSETTS.

PIPE-LINE FOR OIL-STOVES AND OTHER PURPOSES.

1,157,484.

Specification of Letters Patent.

Patented Oct. 19, 1915.

Application filed May 24, 1915. Serial No. 30,217.

*To all whom it may concern:*

Be it known that I, FRED E. WHITE, citizen of the United States, residing at Gardner, Massachusetts, have invented certain new and useful Improvements in Pipe-Lines for Oil-Stoves and other Purposes, of which the following is a specification.

In oil stoves having an oil pipe line from a reservoir and supplying the burners of what is known as the automatic type in which the burners are moved vertically across a maintained oil level to fill or empty, partially or wholly, the burners, it frequently happens that the pipe line becomes filled with impurities in the oil, and it is desirable to provide an easy method of removing these impurities so that an unskilled person can clear the pipe out without requiring the services of an expert.

The invention is applicable to any form of pipe, whether used on oil stoves or in other places where there is apt to be an accumulation of impurities to the extent of clogging the pipe, and it is desirable to remove these accumulations, and hence I do not limit myself to the particular application, but wish to make it clear that my invention has a much broader application than this.

Figure 1:
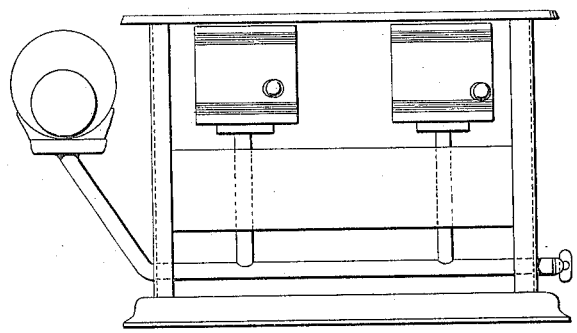
Figure 2:
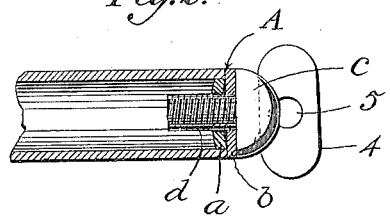
Figure 3:
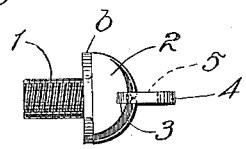

In the accompanying drawing Figure 1 shows a form of oil stove having a reservoir and pipe line, and my invention is applied to the lower end of the pipe line; Fig. 2 is a sectional view of the pipe line with my invention applied thereto; and Fig. 3 is a detail of construction.

The pipe line has its lower end running through the side of the frame, as shown in Fig. 1, and as shown in the sectional view the end of the pipe A is closed with a disk of metal $a$ having a screw-threaded central opening, the disk being made concaved on its outer face so as to form an oil-tight joint with a lead washer $b$ which is carried by a screw $c$, the washer being at the base of the screw thread and supported by the under face of the head of the screw. The screw-threaded portion $d$ enters the threaded opening of the disk, and when the lead washer is screwed tightly to its seat no leakage of oil can occur.

It is desirable to have the screw-threaded plug readily removable so as to render unnecessary the use of a wrench, and it is a part of my invention to provide a headed extension to the screw so as to give an ample purchase for unscrewing the plug and at the same time to provide for the application of the head to an ordinary screw for the sake of economy. In carrying out this part of my invention, as shown in Fig. 3, I use a screw of ordinary construction, the threaded shank being shown at 1, and the head at 2, and this has the usual kerf 3. I slip into this kerf a sheet metal plate of any desired form 4, this plate having a central opening 5. The plate 4 must be of such size and shape as to make a convenient finger grip to screw and unscrew the plug. I then secure the plate to the screw by simply forcing into the opening 5 the opposite edges of the screw at the crown of the arch at each side of the kerf, and this forms an absolutely secure connection in the most economical manner.

What I claim is:—

In combination with a pipe line, a disk closing the end thereof, having an opening centrally thereof, of less diameter than the pipe, a screw plug of uniform diameter throughout and fitting said opening which is threaded to receive it, a handle for the plug and a lead washer carried by the screw plug, and contacting with the disk to make a liquid tight joint, substantially as described.

In testimony whereof, I affix my signature in presence of two witnesses.

FRED E. WHITE.

Witnesses:
WILLIAM W. TAUD,
I. L. SIMENSON.